US009980089B2

(12) United States Patent
Liang

(10) Patent No.: US 9,980,089 B2
(45) Date of Patent: May 22, 2018

(54) METHOD FOR CHANGING PROFILE OF A MOBILE TERMINAL BASED ON LOCATION AND ALTITUDE

(71) Applicant: HTC Corporation, Taoyuan (TW)

(72) Inventor: Yu-Hsin Liang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 26 days.

(21) Appl. No.: 14/601,246

(22) Filed: Jan. 21, 2015

(65) Prior Publication Data

US 2016/0212612 A1 Jul. 21, 2016

(51) Int. Cl.
*H04W 4/02* (2018.01)
*H04W 4/12* (2009.01)

(52) U.S. Cl.
CPC ............ *H04W 4/023* (2013.01); *H04W 4/12* (2013.01)

(58) Field of Classification Search
CPC .......... H04W 8/22; H04W 4/12; H04W 4/023
USPC ......... 455/418, 419, 420, 567, 550.1, 569.2, 455/572, 574
See application file for complete search history.

(56) References Cited

U.S. PATENT DOCUMENTS

| 7,375,688 | B1 * | 5/2008 | Francque | ............ | H01Q 17/001 |
| | | | | | 342/2 |
| 8,195,108 | B2 | 6/2012 | Sheynblat et al. | | |
| 8,380,458 | B2 * | 2/2013 | Wengler | .................. | G01P 13/00 |
| | | | | | 455/404.2 |
| 8,606,253 | B2 | 12/2013 | Ahn et al. | | |
| 2007/0042765 | A1 * | 2/2007 | Bailin | .................... | H04W 48/04 |
| | | | | | 455/419 |
| 2008/0004040 | A1 * | 1/2008 | Bogart | .................. | H04W 48/02 |
| | | | | | 455/456.1 |
| 2008/0272907 | A1 * | 11/2008 | Bonansea | ......... | H04M 1/72519 |
| | | | | | 340/539.11 |
| 2008/0299900 | A1 * | 12/2008 | Lesyna | ................... | H04M 1/66 |
| | | | | | 455/26.1 |
| 2009/0253455 | A1 * | 10/2009 | Huang | .............. | H04M 1/72563 |
| | | | | | 455/550.1 |
| 2009/0280790 | A1 | 11/2009 | Ahn et al. | | |
| 2009/0280858 | A1 * | 11/2009 | Ahn | .................. | H04M 1/72577 |
| | | | | | 455/550.1 |
| 2010/0056124 | A1 * | 3/2010 | Keating | .................. | H04W 4/02 |
| | | | | | 455/418 |

(Continued)

FOREIGN PATENT DOCUMENTS

| CN | 102186226 | 9/2011 |
| CN | 102883072 | 1/2013 |

(Continued)

OTHER PUBLICATIONS

"Office Action of Taiwan Counterpart Application", dated Jan. 25, 2016, p. 1-8.

*Primary Examiner* — Nathan Mitchell
(74) *Attorney, Agent, or Firm* — JCIPRNET

(57) ABSTRACT

A mobile device, a corresponding notification method, and a corresponding computer-readable recording medium are provided. The mobile device includes an output unit and a control unit. The control unit is coupled to the output unit. The control unit controls the output unit to output a notification in response to a signal. The signal is related to an altitude of the mobile device. The notification indicates enabling or disabling an airplane mode of the mobile device.

17 Claims, 3 Drawing Sheets

(56) References Cited

U.S. PATENT DOCUMENTS

| | | | |
|---|---|---|---|
| 2010/0248662 A1* | 9/2010 | Sheynblat | H04W 52/0274 455/127.1 |
| 2010/0267375 A1* | 10/2010 | Lemmon | G06F 21/74 455/418 |
| 2010/0279627 A1* | 11/2010 | Bradley | H04W 48/04 455/69 |
| 2010/0323657 A1* | 12/2010 | Barnard | H04W 4/02 455/404.1 |
| 2011/0241827 A1* | 10/2011 | Varoglu | H04B 7/185 340/5.52 |
| 2012/0310450 A1* | 12/2012 | Srivastav | G08G 5/0021 701/3 |
| 2013/0012181 A1* | 1/2013 | Jeon | H04M 1/72577 455/418 |
| 2013/0065584 A1* | 3/2013 | Lyon | H04W 28/06 455/434 |
| 2013/0295904 A1* | 11/2013 | Putman | H04W 4/046 455/418 |
| 2013/0331067 A1* | 12/2013 | Coussemaeker | G06Q 10/10 455/412.2 |
| 2014/0308940 A1* | 10/2014 | Kwon | H04W 48/02 455/418 |
| 2015/0195399 A1* | 7/2015 | Way | H04M 1/72577 455/418 |
| 2016/0227600 A1* | 8/2016 | Shedletsky | H04M 1/7253 |

FOREIGN PATENT DOCUMENTS

| | | |
|---|---|---|
| CN | 103327162 | 9/2013 |
| CN | 103945365 | 7/2014 |
| TW | 201301844 | 1/2013 |
| WO | 2012051833 | 4/2012 |

* cited by examiner

METHOD FOR CHANGING PROFILE OF A MOBILE TERMINAL BASED ON LOCATION AND ALTITUDE

FIELD OF THE INVENTION

The invention relates a mobile device, and more particularly, relates to a mobile device, a corresponding notification method thereof and a corresponding computer-readable recording medium.

DESCRIPTION OF RELATED ART

Electronic devices such as smart phones, wearable devices and tablet computers have become a part of daily lives, and it is quite common now that one person may own multiple mobile devices.

People frequently travel overseas by an airplane nowadays. During takeoff and landing of the airplane, for ensuring a flight safety, an airplane mode of a mobile device must be enabled to turn off a wireless communication function.

For a user who owns multiple mobile devices, the user needs to manually enable the airplane mode for each of the mobile devices before takeoff, and manually disable the airplane mode for each of the mobile devices after takeoff. Aforesaid processes are to be repeated again during landing of the airplane. In other words, the user needs to manually enable the airplane mode for each of the mobile devices before landing, and manually disable the airplane mode for each of the mobile devices after landing. However, it is possible that the user may forget to enable or disable the airplane mode for some of the mobile devices. If the user forgets to enable the airplane mode, flight safety may be jeopardized accordingly. If the user forgets to disable the airplane mode, the mobile device cannot receive important message in time.

SUMMARY OF THE INVENTION

The invention provides a mobile device, a corresponding notification method and a corresponding non-transitory computer-readable recording medium, which are capable of automatically outputting the notification during takeoff or landing of the airplane, so as prevent the user from forgetting to enable or disable the airplane mode.

The mobile device of the invention includes an output unit and a control unit. The control unit is coupled to the output unit. The control unit controls the output unit to output a notification in response to a signal. The signal is related to an altitude of the mobile device. The notification indicates enabling or disabling an airplane mode of the mobile device.

The notification method of a mobile device of the invention includes the following steps. A signal is received, and the signal is related to an altitude of a mobile device. A notification is outputted in response to the signal, and the notification indicates enabling or disabling an airplane mode of the mobile device.

The invention also provides the non-transitory computer-readable recording medium, which stores a computer program. A mobile device is capable of completing aforesaid notification method after the mobile device loads and executes the computer program.

Based on the above, the invention is capable of automatically outputting the notification during takeoff or landing of the airplane to remind the user, so as prevent the user from forgetting to enable or disable the airplane mode of the mobile device.

DESCRIPTION OF EMBODIMENTS

Figure 1:
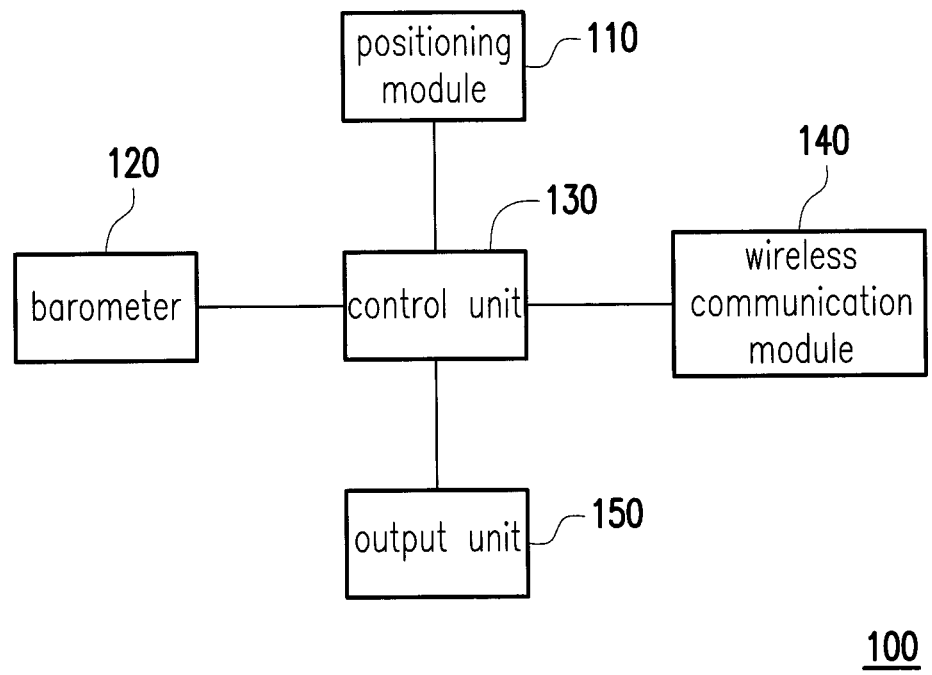
FIG. 1 is a schematic diagram of a mobile device according to an embodiment of the invention.
Figure 2:
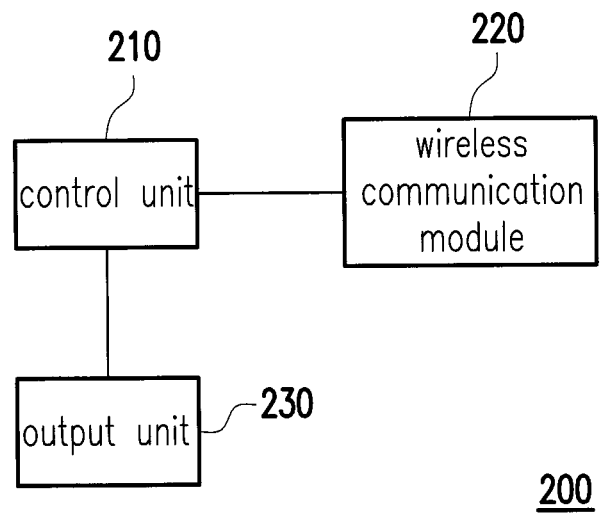
FIG. 2 is a schematic diagram of another mobile device according to an embodiment of the invention.

FIG. 1 is a schematic diagram of a mobile device 100 according to an embodiment of the invention. FIG. 2 is a schematic diagram of another mobile device 200 according to the present embodiment. The mobile device 100 is a primary mobile device, and the mobile device 200 is a secondary mobile device. The mobile device 100 may be a smart hone, a personal digital assistant (PDA) or a tablet computer. The mobile device 200 may be a Bluetooth accessory of the mobile device 100, or a wearable device (e.g., a glasses, a watch, a bracelet or a ring) as an auxiliary to the mobile device 100. The mobile device 100 and the mobile device 200 may communicate with each other via a wireless communication standard in short range, such as the Bluetooth.

The mobile device 100 includes a positioning module 110, a barometer 120, a control unit 130, a wireless communication module 140 and an output unit 150. The control unit 130 is coupled to the positioning module 110, the barometer 120, the wireless communication module 140 and the output unit 150. The control unit 130 controls major functions of the mobile device 100 (e.g., the control unit 130 is capable of executing the notification methods of FIG. 3 and FIG. 4). The positioning module 110 is capable of receiving a satellite-positioning signal of a satellite-positioning system, so that the control unit 130 may calculate a location where the mobile device 100 is located. Aforementioned satellite positioning system may be, for example, a global positioning system (GPS). The barometer 120 is capable of measuring a barometric pressure around the mobile device 100 so that the control unit 130 may calculate an altitude of the mobile device 100. The wireless communication module 140 may support one or more of wireless communication standards including Bluetooth, Wi-Fi, 3G, 4G, and RFID (Radio Frequency Identification), so that the mobile device 100 may communicate with the outside. The output unit 150 is capable of outputting various notifications under control of the control unit 130 to remind a user. The output unit 150 may include a display to display a graphic notification and/or a text notification. The output unit 150 may include a speaker to output a sound notification. The output unit 150 may also include a vibrator to output a vibration notification.

The mobile device 200 includes a control unit 210, a wireless communication module 220 and an output unit 230. The control unit 210 is coupled to the wireless communication module 220 and the output unit 230. The control unit 210 controls major functions of the mobile device 200 (e.g., the control unit 210 may cooperate with the mobile device 100 to execute the notification method of FIG. 4). The wireless communication module 220 may support Bluetooth or Wi-Fi, so that the mobile device 100 and the mobile device 200 may communicate with each other. As similar to the output unit 150, the output unit 230 is capable of outputting various notifications under control of the control unit 210 to remind the user.

Figure 3:
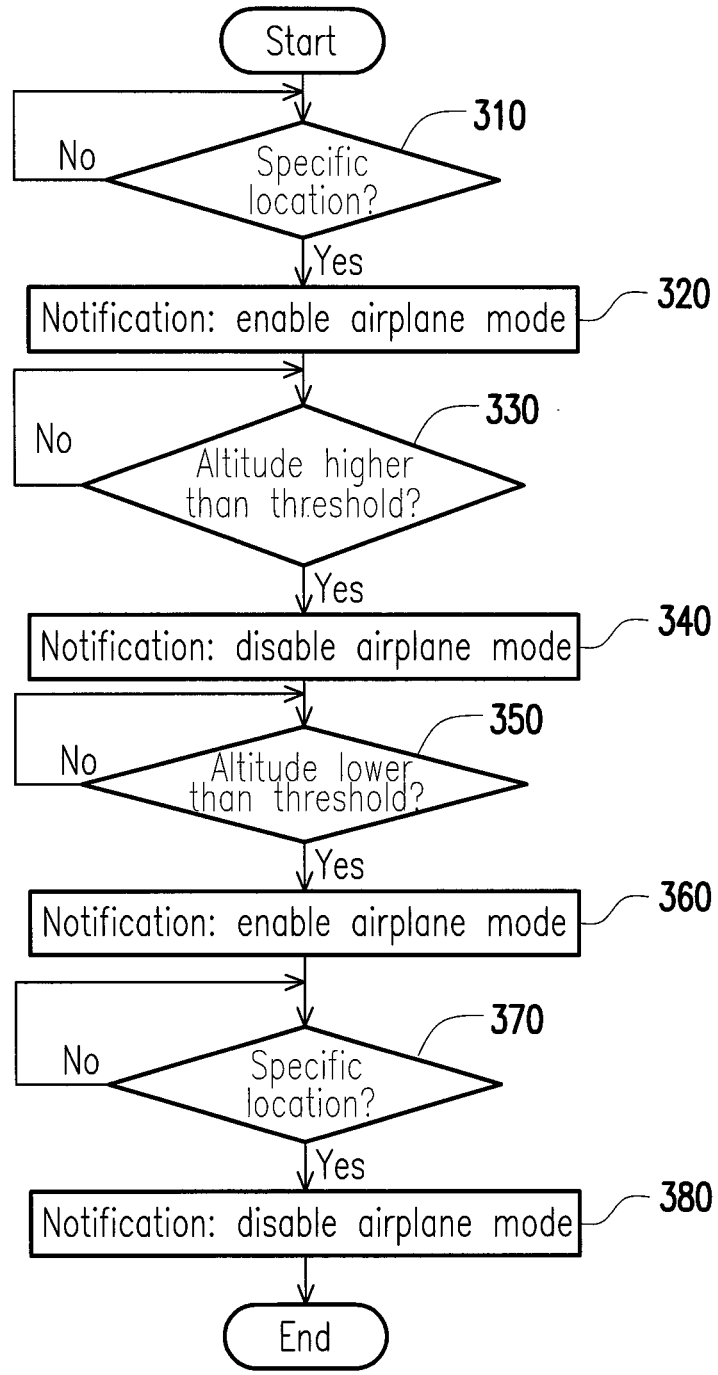
FIG. 3 is a flowchart of a notification method of mobile device according to an embodiment of the invention.

FIG. 3 is a flowchart of a notification method of mobile device according to an embodiment of the invention; and this notification method may be executed by the mobile device 100 with absence of the mobile device 200. First of all, in step 310, the control unit 130 may receive a signal $S_L$ related to the location of the mobile device 100, and determine whether the mobile device 100 enters a specific location according to the signal $S_L$. The specific location refers to areas dedicated for an airplane to land or take off within an airport, such as a parking apron and a runway. When the mobile device 100 enters the specific location, it indicates that the mobile device 100 is on the airplane while the airplane is about to take off.

In an embodiment of the invention, the signal $S_L$ may be the satellite-positioning signal. The control unit 130 may receive the satellite-positioning signal via the positioning module 110. The controller 130 may calculate a coordinate where the mobile device 100 is located according to the signal $S_L$, and set the coordinate as positioning information. The mobile device 100 may be built-in with a database, or connected to a cloud database via the wireless communication module 140. The databases may be stored with the coordinate of said specific location in various major airports. The control unit 130 may use the positioning information to search the database in order to determine whether the mobile device 100 enters the specific location.

In another embodiment, the mobile device 100 may connect to 3G, 4G or Wi-Fi wireless communication networks via the wireless communication module 140, and the signal $S_L$ may come from a base station of the 3G or 4G networks or come from an access point (AP) of the Wi-Fi network. The control unit 130 may receive the signal $S_L$ via the wireless communication module 140, and then receive an identification code of the base station of the 3G or 4G networks from the signal $S_L$ or receive an identification code of the access point of the Wi-Fi network from the signal $S_L$. Said identification codes of the base station or the access point may serve as the positioning information. The mobile device 100 may be built-in with a database, or connected to a cloud database via the wireless communication module 140. The databases may be stored with the identification codes of the base stations or the access points within or around said specific location in various major airports. The control unit 130 may use the positioning information to search the database in order to determine whether the mobile device 100 enters the specific location.

In another embodiment, the signal $S_L$ with specific format may be actively sent by the airport or the airplane through the wireless communication standard (e.g., Bluetooth or RFID) to directly notify the mobile device 100 that it enters the specific location. Alternatively, the airport or the airplane may also actively send the signal $S_L$ via the 3G, 4G or Wi-Fi networks to directly notify the mobile device 100 that it enters the specific location. The control unit 130 may receive the signal $S_L$ via the wireless communication module 140. If the control unit 130 does not receive the signal $S_L$ from the airport or the airplane, it indicates that the mobile device 100 does not enter the specific location yet.

Next, retuning back to step 310. If the control unit 130 determines that the mobile device 100 does not enter the specific location yet, step 310 is repeatedly executed. If the control unit 130 determines that the mobile device 100 enters the specific location, the control unit 130 controls the output unit 150 to output a notification in step 320. This notification may adopt use of one or more forms including a pattern, a text, a sound or a vibration to indicate enabling an airplane mode of the mobile device 100, so as to remind the user to enable the airplane mode of the mobile device 100. The invention does not directly enable or disable the airplane mode, but only output the notification to remind the user, so as to prevent the flight safety from being jeopardized by misjudgments of the control unit 130.

Then, in step 330, the control unit 130 may receive a signal $S_H$ related to the altitude of the mobile device 100. The control unit 130 may determine whether the altitude of the mobile device 100 is higher than a threshold indicating that the airplane has completed takeoff according to the signal $S_H$.

In an embodiment, the barometer 120 may measure the barometric pressure around the mobile device 100, and provide the signal $S_H$ to the control unit 130 according to the barometric pressure. Because the barometric pressure changes with an altitude of the airplane, the control unit 130 is capable of determining the altitude of the mobile device 100 according to the signal $S_H$.

In another embodiment, the signal $S_H$ with specific format may be actively sent by the airplane through the wireless communication standard (e.g., RFID, which does not jeopardize the flight safety) to directly notify the mobile device 100 that its altitude is higher than the threshold. The control unit 130 may receive signal $S_H$ via the wireless communication module 140. If the control unit 130 does not receive the signal $S_H$ from the airplane, it indicates that the altitude of the mobile device 100 is not yet higher than the threshold.

Next, retuning back to step 330. If the control unit 130 determines that the altitude of the mobile device 100 is not higher than the threshold, step 330 is repeatedly executed. If the control unit 130 determines that the altitude of the mobile device 100 is higher than the threshold, the control unit 130 controls the output unit 150 to output a notification in step 340. This notification may adopt use of one or more forms including a pattern, a text, a sound or a vibration to indicate disabling the airplane mode of the mobile device 100, so as to remind the user to disable the airplane mode of the mobile device 100.

Then, in step 350, the control unit 130 may receive said signal $S_H$ related to the altitude of the mobile device 100, and determine whether the altitude of the mobile device 100 is lower than a threshold indicating that the airplane has started landing according to the signal $S_H$.

In an embodiment, the signal $S_H$ is provided to the control unit 130 by the barometer 120. The control unit 130 is capable of determining the altitude of the mobile device 100 according to the signal $S_H$.

In another embodiment, the signal $S_H$ with specific format may be actively sent by the airplane through the wireless communication standard (e.g., Bluetooth or RFID) to directly notify the mobile device 100 that its altitude is lower than the threshold. Alternatively, the airplane may also actively send the signal $S_H$ via the Wi-Fi network to directly notify the mobile device 100 that its altitude is lower than the threshold. The control unit 130 may receive signal $S_H$ via the wireless communication module 140. If the control unit 130 does not receive the signal $S_H$, from the airplane, it indicates that the altitude of the mobile device 100 is not yet lower than the threshold.

Next, retuning back to step 350. If the control unit 130 determines that the altitude of the mobile device 100 is not lower than the threshold, step 350 is repeatedly executed. If the control unit 130 determines that the altitude of the mobile device 100 is lower than the threshold, the control unit 130 controls the output unit 150 to output a notification in step 360. This notification may adopt use of one or more forms including a pattern, a text, a sound or a vibration to indicate enabling an airplane mode of the mobile device 100, so as to remind the user to enable the airplane mode of the mobile device 100.

Subsequently, in step 370, the control unit 130 may receive a signal $S_L$ related to said location of the mobile device 100, and determine whether the mobile device 100 enters the specific location according to the signal $S_L$. As described above, the specific location refers to the areas dedicated for the airplane to land or take off within the airport. In the case when the mobile device 100 enters the specific location, it indicates that airplane has completed landing.

In an embodiment of the invention, the signal $S_L$ may be the satellite-positioning signal. The control unit 130 may receive the satellite-positioning signal via the positioning module 110. The controller 130 may calculate a coordinate where the mobile device 100 is located according to the signal $S_L$, and set the coordinate as positioning information. The mobile device 100 may be built-in with a database, and this database may be stored with the coordinate of said specific location in various major airports. The control unit 130 may use the positioning information to search the database in order to determine whether the mobile device 100 enters the specific location.

In another embodiment, the signal $S_L$ with specific format may be actively sent by the airplane through the wireless communication standard (e.g., RFID, which does not jeopardize the flight safety) to directly notify the mobile device 100 that it enters the specific location. The control unit 130 may receive the signal $S_L$ via the wireless communication module 140. If the control unit 130 does not receive the signal $S_L$ from the airplane, it indicates that the mobile device 100 does not enter the specific location yet.

Next, retuning back to step 370. If the control unit 130 determines that the mobile device 100 does not enter the specific location yet, step 370 is repeatedly executed. If the control unit 130 determines that the mobile device 100 enters the specific location, the control unit 130 controls the output unit 150 to output a notification in step 380. This notification may adopt use of one or more forms including a pattern, a text, a sound or a vibration to indicate disabling the airplane mode of the mobile device 100, so as to remind the user to disable the airplane mode of the mobile device 100.

Figure 4:
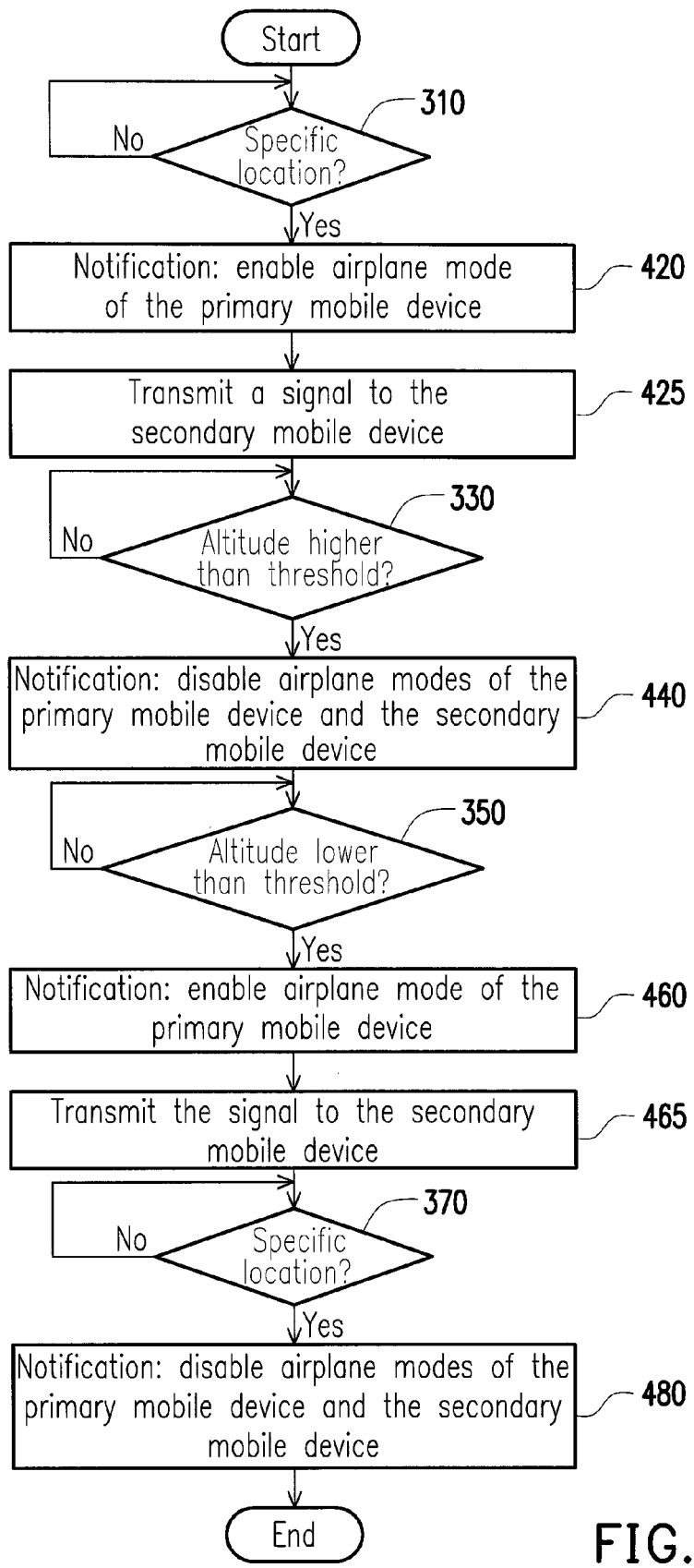
FIG. 4 is a flowchart of a notification method of mobile device according to another embodiment of the invention.

FIG. 4 is a flowchart of a notification method of mobile device according to another embodiment of the invention, and this notification method may be executed by the primary mobile device 100 with presence of the secondary mobile device 200. First of all, step 310 is identical to that in the notification method of FIG. 3, thus detail thereof is not repeated hereinafter. If the control unit 130 determines that the primary mobile device 100 enters the specific location in step 310, the control unit 130 controls the output unit 150 to output a notification in step 420. This notification may adopt use of one or more forms including a pattern, a text, a sound or a vibration to indicate enabling an airplane mode of the primary mobile device 100, so as to remind the user to enable the airplane mode of the primary mobile device 100. In addition, in step 425, the control unit 130 transmits a signal via the wireless communication module 140 to control the secondary mobile device 200. The control unit 210 of the secondary mobile device 200 may receive such signal via the wireless communication module 220 and then control the output unit 230 to output a notification. This notification may adopt use of one or more forms including a pattern, a text, a sound or a vibration to indicate enabling an airplane mode of the secondary mobile device 200, so as to remind the user to enable the airplane mode of the secondary mobile device 200.

The following step 330 is identical to that in the notification method of FIG. 3, thus detail thereof is not repeated hereinafter. If the control unit 130 determines that the altitude of the primary mobile device 100 is higher than the threshold in step 330, the control unit 130 controls the output unit 150 to output a notification in step 440. This notification may adopt use of one or more forms including a pattern, a text, a sound or a vibration to indicate disabling the airplane modes of the primary mobile device 100 and the secondary mobile device 200, so as to remind the user to disable the airplane modes of the two mobile devices. Because the wireless communication cannot be conducted between the two mobile devices when the airplane mode is enabled, the primary mobile device 100 cannot transmit the signal to control the secondary mobile device 200, and instead, the primary mobile device 100 can only output the notification to remind the user to disable the airplane modes of the two mobile devices.

The following step 350 is identical to that in the notification method of FIG. 3, thus detail thereof is not repeated hereinafter. If the control unit 130 determines that the altitude of the primary mobile device 100 is lower than the threshold in step 350, the control unit 130 controls the output unit 150 to output a notification in step 460. This notification may adopt use of one or more forms including a pattern, a text, a sound or a vibration to indicate enabling an airplane mode of the primary mobile device 100, so as to remind the user to enable the airplane mode of the primary mobile device 100. In addition, in step 465, the control unit 130 transmits a signal via the wireless communication module 140 to control the secondary mobile device 200. The control unit 210 of the secondary mobile device 200 may receive such signal via the wireless communication module 220 and then control the output unit 230 to output a notification. This notification may adopt use of one or more forms including a pattern, a text, a sound or a vibration to indicate enabling an airplane mode of the secondary mobile device 200, so as to remind the user to enable the airplane mode of the secondary mobile device 200.

The following step 370 is identical to that in the notification method of FIG. 3, thus detail thereof is not repeated hereinafter. If the control unit 130 determines that the primary mobile device 100 enters the specific location in step 370, the control unit 130 controls the output unit 150 to output a notification in step 480. This notification may adopt use of one or more forms including a pattern, a text, a sound or a vibration to indicate disabling the airplane modes of the primary mobile device 100 and the secondary mobile device 200, so as to remind the user to disable the airplane modes of the two mobile devices.

The invention also provides a computer-readable recording medium, and such recording medium may be a physical storage device such as a memory, a hard disk or optical disk. This recording medium may store a computer program. A mobile device can complete the notification methods of FIG. 3 or FIG. 4 after the mobile device loads and executes the computer program.

In summary, the invention is capable of automatically outputting the notification during takeoff or landing of the airplane to remind the user, so as prevent the user from forgetting to enable or disable the airplane mode of the mobile device. Also, the invention allows the primary mobile device and the secondary mobile device to output the notifications altogether.

What is claimed is:

1. A mobile device, comprising:
   an output unit; and
   a control unit, coupled to the output unit, and controlling the output unit to output a second notification in response to a second signal to indicate a user to enable an airplane mode, wherein the second signal is related to a location of the mobile device,
   after the operation of outputting the second notification in response to the second signal, the control unit controls the output unit to output a first notification in response to a first signal, wherein the first signal is related to the altitude of the mobile device, and the first notification indicates enabling or disabling an airplane mode of the mobile device,
   wherein when the first signal indicates that the altitude of the mobile device is higher than a first threshold indicating that the airplane has completed takeoff, the first notification indicates disabling the airplane mode; and when the first signal indicates that the altitude of the mobile device is lower than a second threshold indicating that the airplane has started landing, the first notification indicates enabling the airplane mode.

2. The mobile device according to claim 1, further comprising:
   a wireless communication module, coupled to the control unit, and the control unit receiving the first signal via the wireless communication module.

3. The mobile device according to claim 1, further comprising:
   a barometer, coupled to the control unit, measuring a barometric pressure around the mobile device, and providing the first signal to the control unit according to the barometric pressure.

4. The mobile device according to claim 1, further comprising:
   a wireless communication module, coupled to the control unit, the control unit receiving the second signal via the wireless communication module.

5. The mobile device according to claim 1, wherein the control unit generates positioning information according to the second signal, and uses the positioning information to search a database in order to determine whether the mobile device enters a specific location; and when the mobile device enters the specific location, the control unit controls the output unit to output the second notification.

6. The mobile device according to claim 5, further comprising:
   a positioning module, coupled to the control unit, and receiving the second signal, wherein the second signal is a satellite-positioning signal, the control unit calculates a coordinate where the mobile device is located according to the second signal, and the positioning information is the coordinate.

7. The mobile device according to claim 5, further comprising:
   a wireless communication module, coupled to the control unit, and receiving the second signal, wherein the control unit obtains an identification code of a base station or an access point from the second signal, and the positioning information is the identification code.

8. The mobile device according to claim 1, further comprising:
   a wireless communication module, coupled to the control unit, wherein when the control unit controls the output unit to output the first notification, the control unit transmits a third signal via the wireless communication module in order to control a secondary mobile device to output a third notification, and the third notification indicates enabling an airplane mode of the secondary mobile device.

9. The mobile device according to claim 1, wherein the first notification indicates disabling the airplane mode of the mobile device and disabling an airplane mode of a secondary mobile device.

10. A notification method of a mobile device, comprising:
    receiving a first signal, wherein the first signal is related to an altitude of the mobile device;
    outputting a second notification in response to a second signal to indicate a user to enable an airplane mode, wherein the second signal is related to a location of the mobile device;
    after the step of outputting the second notification in response to the second signal, outputting a first notification in response to the first signal, wherein the first signal is related to the altitude of the mobile device, and the first notification indicates enabling or disabling an airplane mode of the mobile device;
    when the first signal indicates that the altitude of the mobile device is higher than a first threshold indicating that the airplane has completed takeoff, the first notification indicates disabling the airplane mode; and
    when the first signal indicates that the altitude of the mobile device is lower than a second threshold indicating that the airplane has started landing, the first notification indicates enabling the airplane mode.

11. The notification method according to claim 10, further comprising:
    measuring a barometric pressure around the mobile device; and
    providing the first signal according to the barometric pressure.

12. The notification method according to claim 10, further comprising:
    generating positioning information according to the second signal;
    using the positioning information to search a database in order to determine whether the mobile device enters a specific location; and
    when the mobile device enters the specific location, outputting the second notification.

13. The notification method according to claim 12, further comprising:
    calculating a coordinate where the mobile device is located according to the second signal, wherein the second signal is a satellite-positioning signal, and the positioning information is the coordinate.

14. The notification method according to claim 12, further comprising:
    obtaining an identification code of a base station or an access point from the second signal, wherein the positioning information is the identification code.

15. The notification method according to claim 10, further comprising:
    when the first notification is outputted, transmitting a third signal to control a secondary mobile device to output a third notification, wherein the third notification indicates enabling an airplane mode of the secondary mobile device.

16. The notification method according to claim 10, wherein the first notification indicates disabling the airplane mode of the mobile device and disabling an airplane mode of a secondary mobile device.

17. A non-transitory computer-readable recording medium, storing a computer program, and a mobile device is capable of completing the notification method of claim 10 after the mobile device loads and executes the computer program.

\* \* \* \* \*